US012680371B2

(12) United States Patent
Steffes

(10) Patent No.: US 12,680,371 B2
(45) Date of Patent: Jul. 14, 2026

(54) INSULATING CONCRETE FORM BUCK

(71) Applicant: Gregory R. Steffes, Beaver Dam, WI (US)

(72) Inventor: Gregory R. Steffes, Beaver Dam, WI (US)

( * ) Notice: Subject to any disclaimer, the term of this patent is extended or adjusted under 35 U.S.C. 154(b) by 154 days.

(21) Appl. No.: 18/537,424

(22) Filed: Dec. 12, 2023

(65) Prior Publication Data

US 2024/0200390 A1 Jun. 20, 2024

Related U.S. Application Data

(60) Provisional application No. 63/432,940, filed on Dec. 15, 2022.

(51) Int. Cl.
*E04G 15/02* (2006.01)
*E06B 1/02* (2006.01)
*E06B 1/60* (2006.01)

(52) U.S. Cl.
CPC .............. *E06B 1/02* (2013.01); *E06B 1/6038* (2013.01); *E04G 15/02* (2013.01)

(58) Field of Classification Search
CPC ... E06B 1/02; E06B 1/04; E06B 1/325; E06B 1/6038; E06B 2003/26321; E06B 3/26341; E06B 3/267; E06B 3/2675; E06B 3/277; E04G 13/068; E04G 15/02
See application file for complete search history.

(56) References Cited

U.S. PATENT DOCUMENTS 5,579,618 A * 12/1996 Riegelman .............. E06B 3/205 52/656.1
6,070,375 A * 6/2000 Anderson ................. E06B 1/16 49/504
8,117,802 B1 * 2/2012 Kisch ........................ E04C 3/02 52/844
8,931,220 B2 1/2015 Stewart et al.
9,016,011 B2 4/2015 Stewart
9,109,360 B2 8/2015 Stewart
9,151,046 B1 * 10/2015 Francavilla ............... E04C 2/06
2009/0193729 A1 * 8/2009 Kustermann ......... E04B 2/8652 52/215
2011/0214370 A1 * 9/2011 Stewart ...................... E06B 1/32 52/215
2011/0308180 A1 * 12/2011 Kolzer ................ E06B 3/26345 52/309.4
2013/0074433 A1 * 3/2013 Ciuperca ................... E04B 1/41 52/698
2014/0130431 A1 * 5/2014 Stewart ...................... E06B 1/02 52/215
2017/0058591 A1 * 3/2017 Garrett ...................... E06B 1/02

FOREIGN PATENT DOCUMENTS

GB 2082235 A * 3/1982 ............. E06B 3/222

* cited by examiner

*Primary Examiner* — Kyle J. Walraed-Sullivan
(74) *Attorney, Agent, or Firm* — R. John Bartz

(57) ABSTRACT

An insulated concrete form buck has a plurality of generally rectangular buck sections. Each buck section has an inner core surrounded by a layer of foam insulation. The outer surface of the core is pre-treated with an adhesive to adhere the core to the foam insulation. Fasteners hold the buck sections together in the assembled buck. Concrete anchors threaded into the core have looped openings for receiving reinforcing bars in an insulating form concrete wall construction.

14 Claims, 6 Drawing Sheets

INSULATING CONCRETE FORM BUCK

CROSS REFERENCE TO RELATED APPLICATION

This application claims the priority of U.S. application Ser. No. 63/432,940 filed Dec. 15, 2022.

FIELD OF THE INVENTION

The technology of the invention relates to insulating concrete form window bucks and insulating concrete form door bucks used in construction of poured concrete walls in building structures.

BACKGROUND OF THE INVENTION

Construction and fabrication of poured concrete walls typically use insulating concrete form systems to form an interior cavity for receiving pourable cement. The insulating concrete form systems utilize foam panels made from rigid foam insulation to insulate a building and maintain a form for concrete pouring. The panels are reversible, modular and stackable in an offset manner to form various wall heights. Typically the foam insulating panels are left in place after concrete placement so as to provide insulation for the finished concrete wall. The panels can be of various shapes and sizes having interiors being flat, undulating or grooved. Ties or connectors hold the panels in place for concrete placement and finishing.

Openings in the concrete walls are formed in place prior to concrete placement utilizing window buck or door buck frames. Window and door bucks are commonly made from flat lumber stocks mounted within the opening using wall strapping which is subsequently removed after the concrete has cured.

Another method for framing a window buck and a door buck uses an inset buck that fits into the wall form cavity. The inset buck is held in place with integrated grooves or with fasteners that extend through the form work material into the buck frame material whereby the buck is firmly secured in position inside the wall cavity.

Another method for framing a window buck and a door buck includes a step of providing a flat stock material shaped profile with integrated exterior strapping. The strapping holds the buck securely in place during concrete placement. The strapping remains permanently in place.

Existing buck materials and designs result in various problems due to exterior fins or strapping adding unwanted thickness to the overall width of the wall. The extra thickness around door and window openings hinders finishing and makes it difficult to drain water from the tops of the window and door openings. Other short comings in prior bucks are having to incorporate additional components around each buck for securely positioning reinforcement elements in proper positions and also having to provide additional anchoring to the concrete wall to permanently hold the buck in position and support additional loads that are applied to the buck frame.

SUMMARY OF THE INVENTION

The insulating concrete form buck of the invention has an inner core surrounded by an outer layer of rigid foam insulation. An adhesive pre-applied to the outer surface of the core adheres to the layer of foam insulation and holds the core and the outer layer together by surface attachment that resists separation.

DESCRIPTION OF THE INVENTION

Figure 1:
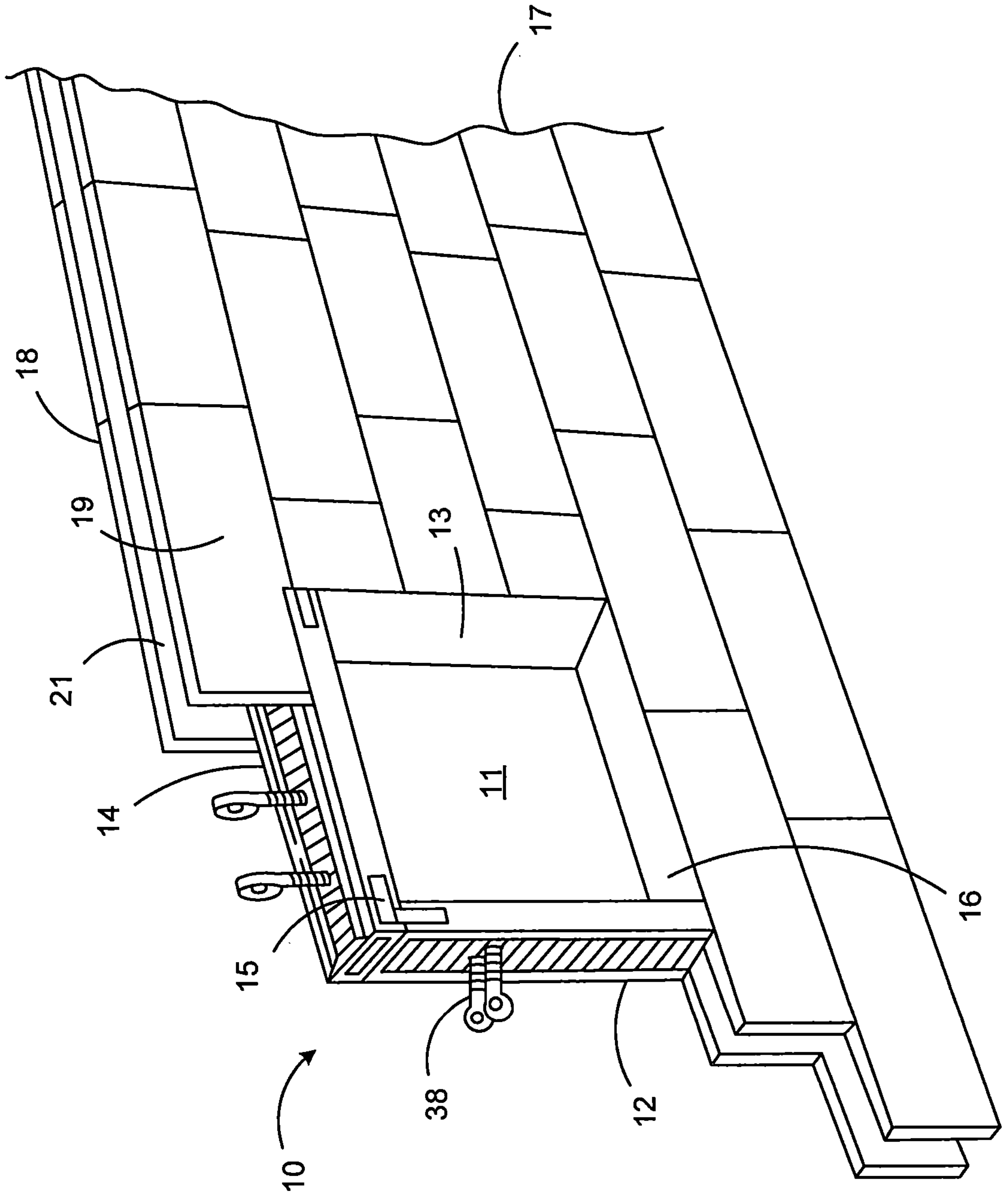
FIG. 1 is a perspective view of the insulating concrete form buck of the invention set into an insulated concrete form wall.
Figure 2:
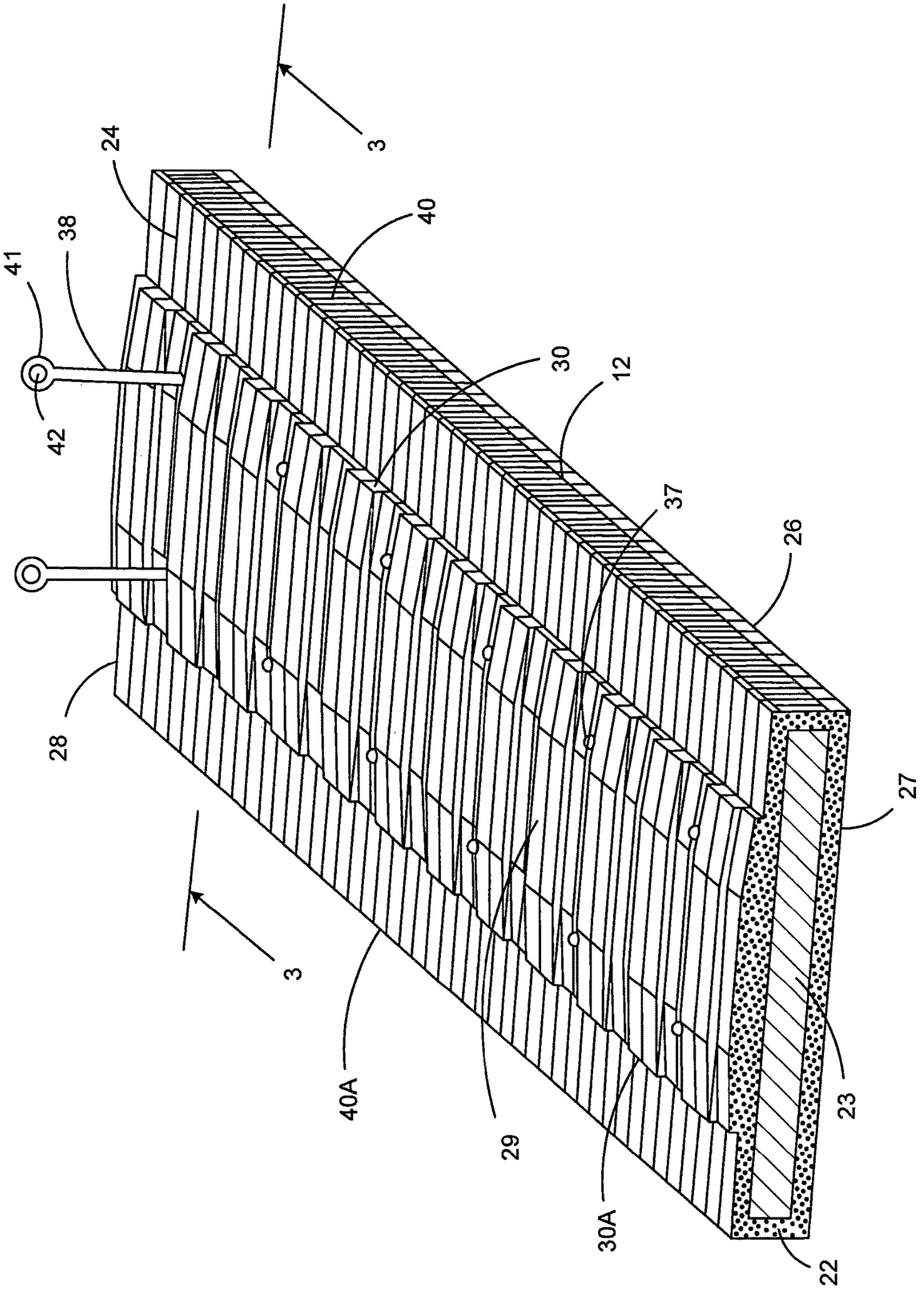
FIG. 2 is a perspective view of a section of the insulating concrete form buck of FIG. 1.
Figure 3:
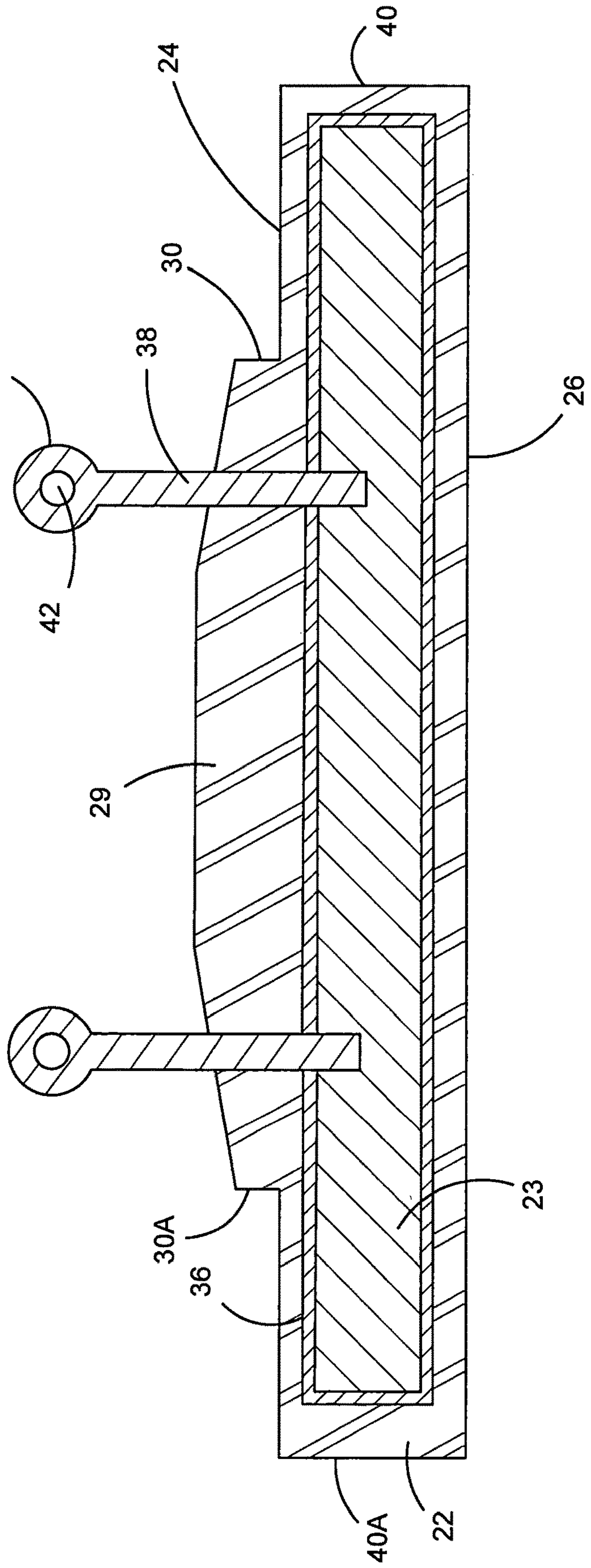
FIG. 3 is an enlarged sectional view taken along line 3-3 of FIG. 2.
Figure 4:
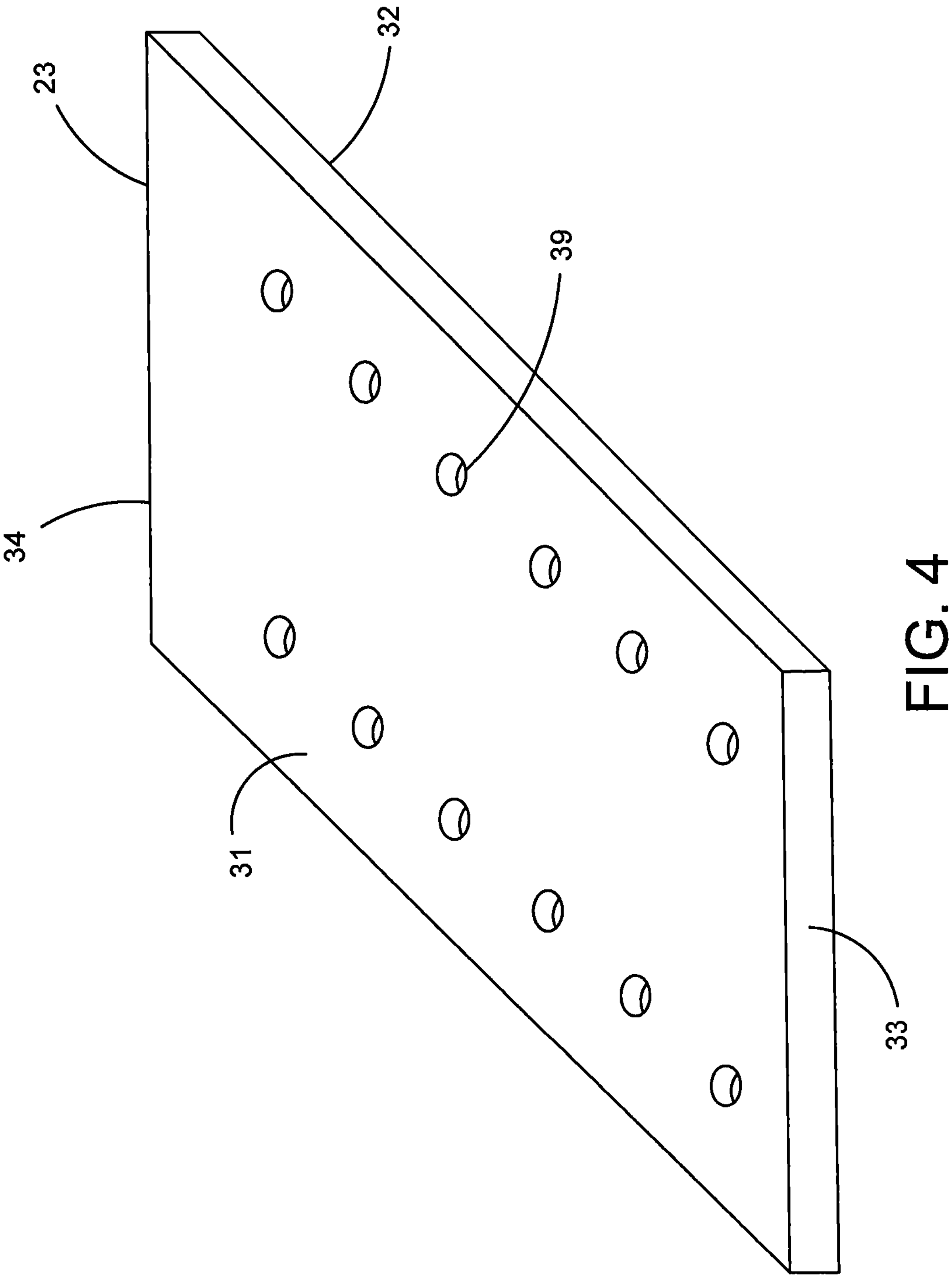
FIG. 4 is a perspective view of the core of the section of the insulating concrete form buck of FIG. 2.

In the following detailed descriptions of the insulating concrete form buck, reference is made to the accompanying drawing that form a part hereof, and in which are shown, by way of illustration, specific embodiments in which the invention may be practiced. It is to be understood that other embodiments may be utilized and structure changes may be made or other method steps and sequence thereof may be used without departing from the scope of the present invention. The insulating concrete form buck is herein described as used in home and business structures. The buck can have uses in other environments when openings in concrete walls are desired.

Referring to FIGS. 1 to 4, there is shown an insulating concrete form buck indicated generally at 10 useable to provide for a rough opening 11 for window units and door units in an insulating concrete form wall 17. Buck 10 is useable in a variety of wall forms in addition to insulated concrete form wall structures, such as a flat wall system or a type of waffle grid or a post and beam insulated concrete form system or in standard form concrete walls.

Buck 10 has an upright right side buck section 12 and an upright left side buck section 13 located opposite right side buck section 12 and extending in the same direction as right side buck section 12. A top buck section 14 and a bottom buck section 16 extend between right side buck section 12 and left side buck section 13 to complete a square or rectangular assembled buck 10. Fasteners 15 at the corners of the assembled buck 10 hold buck sections 12, 13, 14 and 16 together.

Insulated concrete form wall 17 is made from a plurality of individual insulating concrete form blocks 18. Each block 18 has a pair of side panels 19 held in transverse spaced alignment by internal spacer webs spanning across wall cavity 21 of insulating concrete form block 18 for accepting poured concrete for a concrete wall core.

Buck sections 12, 13, 14 and 16 are identical in structure and function. The following description of buck section 12 is applicable to buck sections 13, 14 and 16 of concrete form buck 10. Buck section 12 is a generally rectangular member having an outer layer 22 of rigid foam insulation surrounding an inner core 23. Outer layer 22 has an exposed section face 24 and a generally flat internal section face 26 and opposite ends 27 and 28 and opposite sides 40 and 40A. Exposed section face 24 has a raised, outwardly tapered or peaked central section 29 with upright sides 30 and 30A for self draining of water away from buck section 12. Inner core 23 is a solid wooden plank or board core having an outer surface 31 and an inner surface 32 opposite outer surface 31. Ends 33 and 34 of core 23 are evenly aligned with ends 27 and 28 of outer layer 22. An intermediate layer 36 of adhesive applied to outer surface 31 and inner surface 32 of core 23 adheres to the rigid foam insulation of outer layer 22 to hold outer layer 22 onto inner core 23.

Anchor insertion points 37 in exposed section face 24 of outer layer 22 allow for easy insertion of concrete anchors 38. Outer surface 31 of core 23 has a plurality of threaded openings 39 adapted to receive threaded ends 41 of anchors 38. Openings 39 are aligned with insertion points 37 in exposed section face 24 of outer layer 22. Anchor insertion points 37 and threaded openings 39 are situated to line up with wall cavity 21 whereby anchors 38 extend into wall cavity 21. Each anchor 38 has an outer end 41 having a looped opening 42 for holding reinforcing bar in wall cavity 21 in the form concrete wall construction.

Buck section 12 is preferably formed by using a molding process whereby outer surface 31 and inner surface 32 of core 23 are pre-applied with an adhesive by spraying, brushing, film application and the like, to form intermediate layer 36 around core 23. Core 23 is then placed in a mold filled with an insulation material, such as a liquid insulation foam material which subsequently hardens or sets to form outer layer 22 whereby outer layer 22 adheres to and surrounds core 23.

Figure 5:
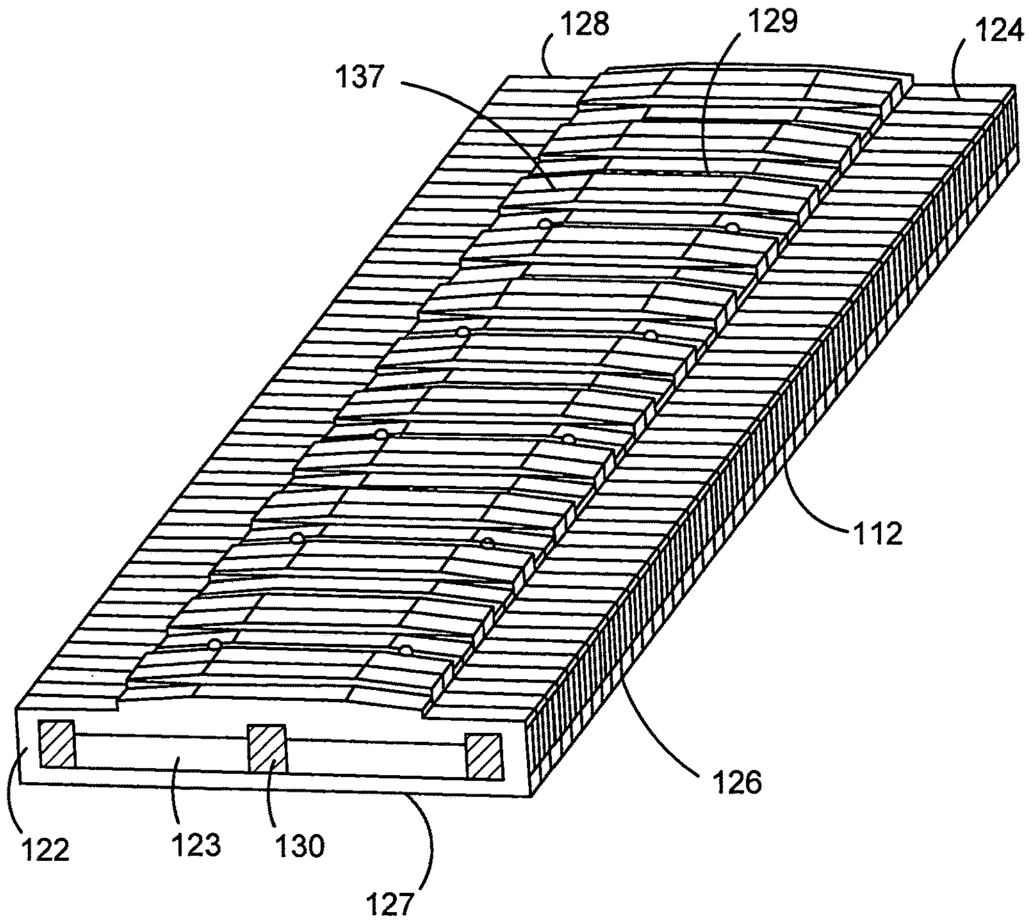
FIG. 5 is a perspective view of a modification of the section of the insulating concrete form buck of FIG. 2.
Figure 6:
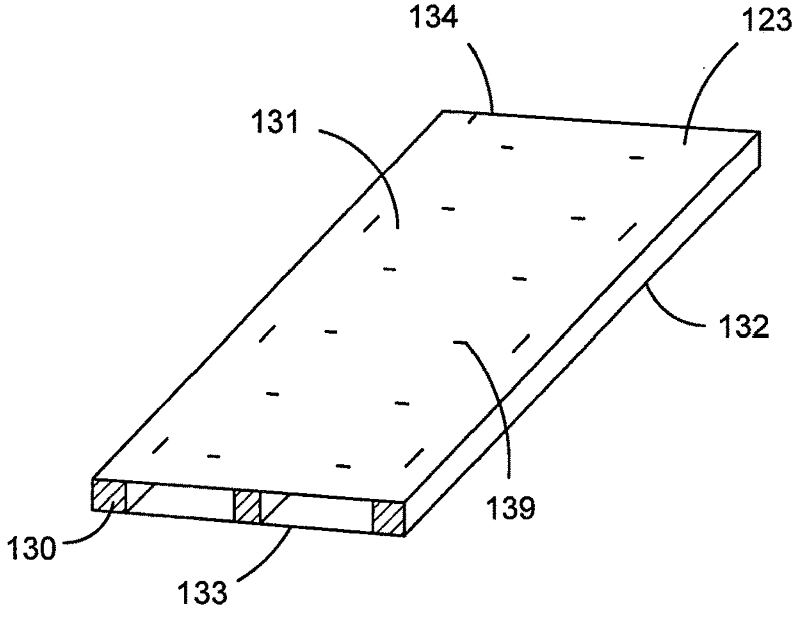
FIG. 6 is a perspective view of the core of the section of the insulating concrete form buck of FIG. 5.

A second embodiment of buck section 112 is shown in FIGS. 5 and 6. Buck section 112 is a generally rectangular member having an outer layer 122 of rigid foam insulation surrounding an inner core 123. Outer layer 122 has an exposed section face 124 and a generally flat internal section face 126 and opposite ends 127 and 128. Exposed section face 124 has an outwardly tapered or peaked central section 129 for self draining of water away from buck section 112. Inner core 123 is a plastic plank core having hollow extruded elements 130. Core 123 has an outer surface 131 and an inner surface 132 opposite outer surface 131. Ends 133 and 134 of core 123 are evenly aligned with ends 127 and 128 of outer layer 122. Anchor insertion points 137 in exposed section face 124 of outer layer 122 allow for insertion of concrete anchors 38. Outer surface 131 of core 123 has a plurality of threaded openings 139 adapted to receive threaded ends of anchors 38. Openings 139 of core 123 are aligned with insertion points 137 in exposed section face 124 of outer layer 122. Anchor insertion points 137 and openings 139 are situated to line up with wall cavity 21 whereby anchors 38 are adapted to extend into wall cavity 21. Buck section 212 is made by pre-applying a layer of adhesive to outer surface 131 and inner surface 132 of core 123 during the molding process whereby the foam insulation of outer layer 122 molded onto core 123 adheres to inner core 123.

Figure 7:
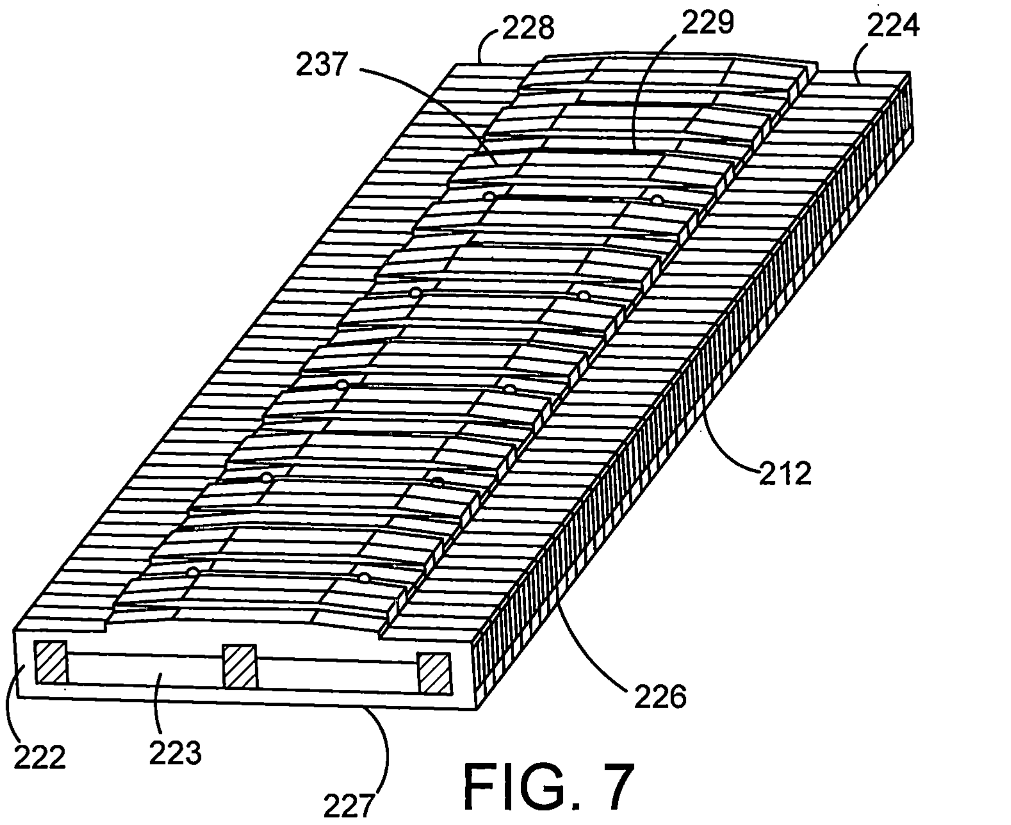
FIG. 7 is a perspective view of a second modification of the section of the insulating concrete form buck of FIG. 2.
Figure 8:
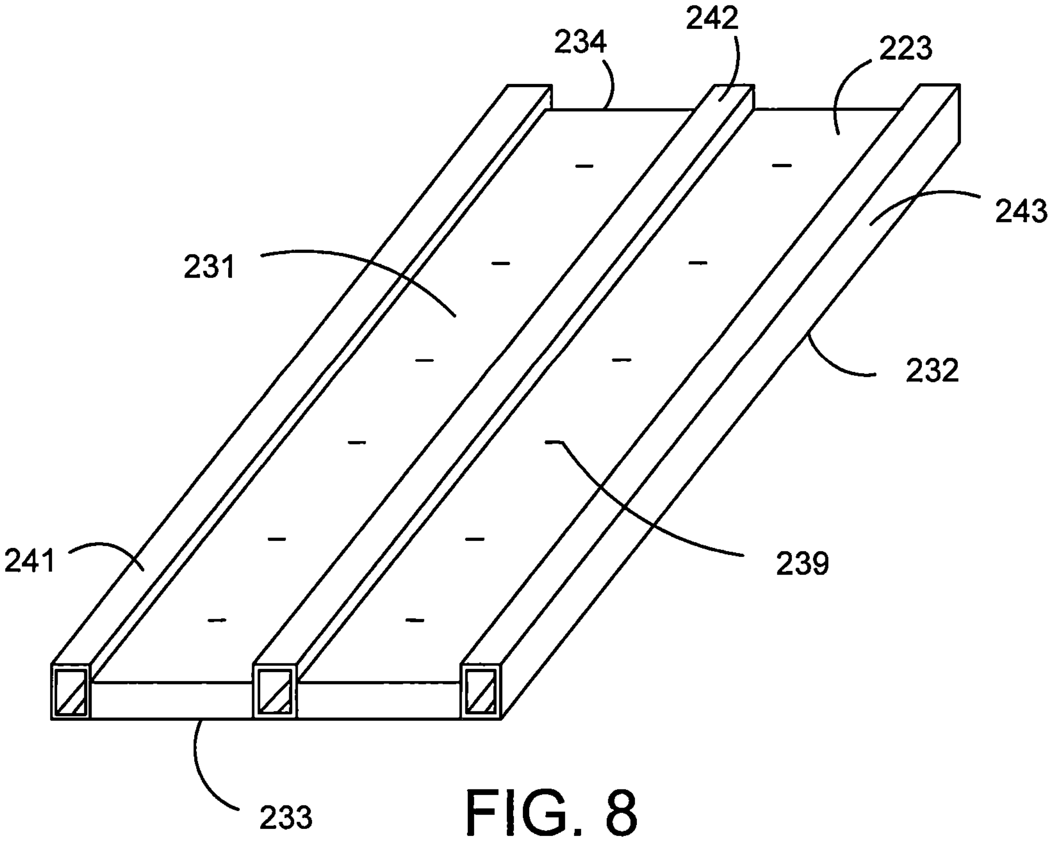
FIG. 8 is a perspective view of the core of the section of the insulating concrete form buck of FIG. 7.

A third embodiment of buck section 212 is shown in FIGS. 7 and 8. Buck section 212 is a rectangular member having an outer layer 222 of rigid foam insulation surrounding an inner core 223. Outer layer 222 has an exposed section face 224 and a flat internal section face 226 and opposite ends 227 and 228. Exposed section face 224 has an outwardly tapered or peaked central section 229 for self draining of water. Inner core 223 is a form metal member having a plurality of elongated rectangular tube elements 241, 242 and 243, an outer surface 231 and an inner surface 232 opposite outer surface 231. Tube elements 241, 242 and 243 each have a thickness or width that is greater than the thickness or width of core 223 between surfaces 231 and 232 whereby tube elements 241, 242 and 243 extend above outer surface 231. Tube elements 241 and 243 extend longitudinally along opposite sides of core 223. Tube element 242 extends longitudinally along the central portion of core 223. Ends 233 and 234 of core 223 are evenly aligned with ends 227 and 228 of outer layer 222. Anchor insertion points 237 in exposed section face 224 of outer layer 222 enable insertion of concrete anchors 38. Outer surface 231 of core 223 has a plurality of threaded openings 239 adapted to receive threaded ends of concrete anchors 38. Openings 239 are aligned with insertion points 237 in exposed section face 224 of outer layer 222. Anchor insertion points 237 and openings 239 are situated to align with wall cavity 21 allowing concrete anchors 38 to extend into wall cavity 21. To make buck section 212, an intermediate layer of adhesive is pre-applied to outer surface 231 and inner surface 232 of core 223 so as to adhere to outer layer 222 when outer layer 222 is molded onto inner core 223.

The insulating concrete form window buck illustrated and described includes several embodiments of the invention. Variations and modifications of the buck and the buck materials can be made by a person skilled in the art without departing from the invention.

The invention claimed is:

1. An insulating concrete form buck for an insulated concrete form wall comprising:

a top buck section, a bottom buck section, side buck sections joined to the top buck section and the bottom buck section to define an opening, each of the top buck section, the bottom buck section and the side buck sections having an inner core, an outer layer of insulation material surrounding the inner core and opposite sides, the outer layer of insulation material having an exposed section face and an internal section face adjacent the opening, the exposed section face having a raised central section for self draining of water toward each of the opposite sides, and a plurality of concrete anchors attached to the inner core and extending outwardly through the raised central section.

2. The insulating concrete form buck of claim 1 wherein:

the raised central section is peaked and outwardly tapered toward each of the opposite sides.

3. The insulating concrete form buck of claim 1 wherein:

each of the plurality of concrete anchors has an outer end with a looped opening.

4. The insulating concrete form buck of claim 1 including:

an intermediate layer of adhesive surrounding the inner core and located between the outer layer of insulation material and the inner core to hold the outer layer of insulation material on the inner core.

5. The insulating concrete form buck of claim 1 wherein:

the inner core is a solid wood plank core.

6. The insulating concrete form buck of claim 1 wherein:

the inner core is a hollow extruded one-piece plastic plank core.

7. The insulating concrete form buck of claim 1 wherein:

the inner core is a formed metal member.

8. The insulating concrete form buck of claim 1 wherein:
the outer layer is a polystyrene foam layer.

9. The insulating concrete form buck of claim 1 including:
fasteners located at adjacent corners of the top buck section, the bottom buck section and the side buck sections to fasten the top buck section and the bottom buck section to the side buck sections.

10. A method of making an insulating concrete form buck section for an insulated concrete form buck comprising:
providing an inner core,
providing the inner core with an outer surface, an inner surface opposite the outer surface and opposite ends,
providing a plurality of elongated elements extending longitudinally between the opposite ends of the inner core,
providing the inner core with a first thickness,
providing each of the plurality of elongated elements with a second thickness greater than the first thickness of the inner core,
applying adhesive to the outer surface and the inner surface of the inner core,
molding an outer layer of insulating foam material to the adhesive whereby the outer layer of insulating foam material surrounds the inner core and adheres to the inner core,
providing the outer layer of insulating foam material with an exposed section face, and
raising a central section of the exposed section face for self-draining of water away from the inner core.

11. The method of claim 10 including:
pre-applying the adhesive to the outer surface and the inner surface of the inner core to form an intermediate adhesive layer surrounding the inner core.

12. The method of claim 10 wherein:
providing the outer layer of insulating foam material with an exposed section face and opposite sides, and
outwardly tapering and peaking a central section of the exposed section face whereby the central section tapers toward each of the opposite sides.

13. The method of claim 10 including:
attaching at least one concrete anchor to the inner core, and
extending the at least one concrete anchor outwardly through the outer layer of insulating foam material.

14. The method of claim 13 including:
the at least one concrete anchor has an outer end, and
looping the outer end to form a looped opening.

* * * * *